Patented Aug. 25, 1936

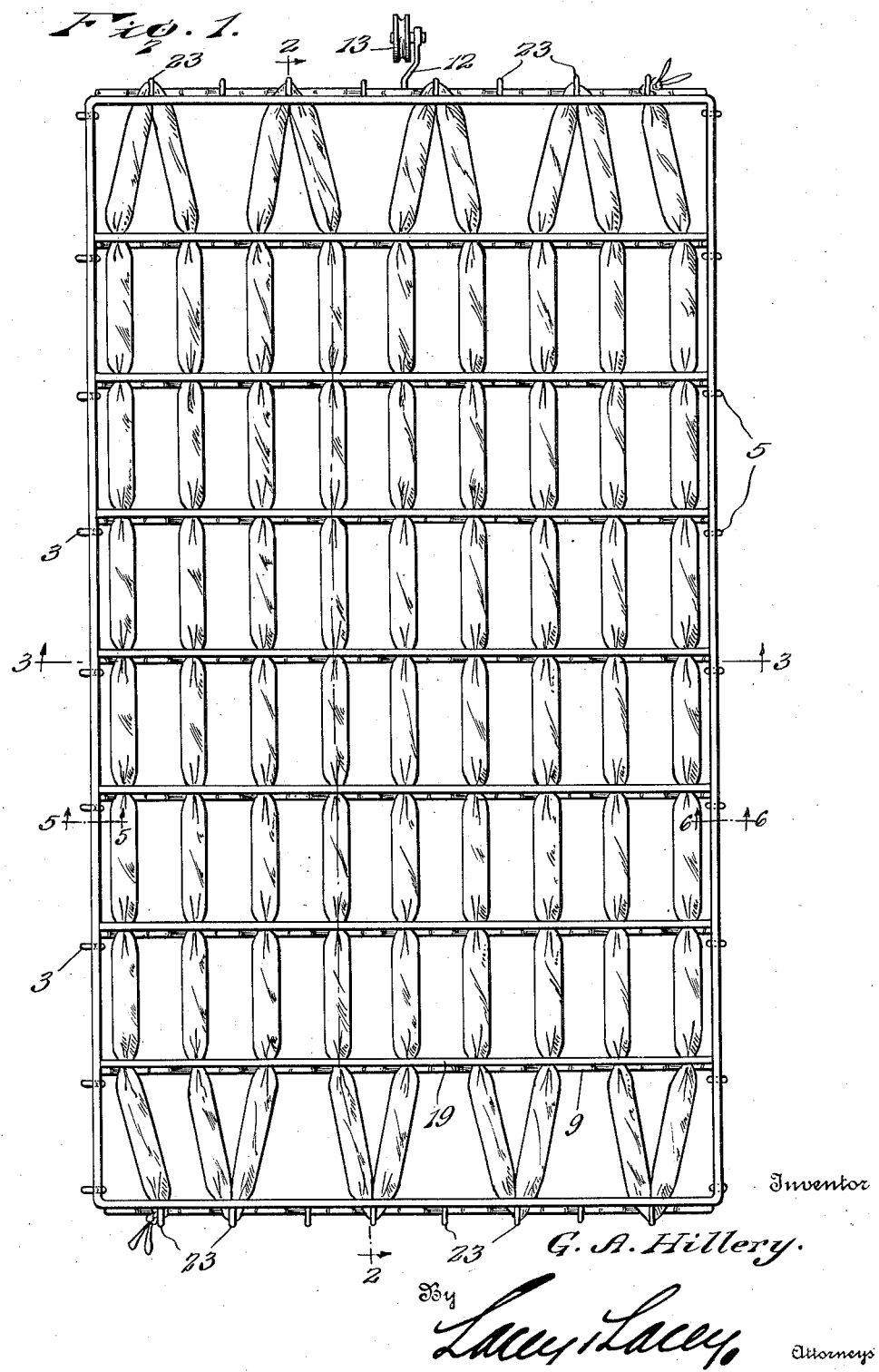

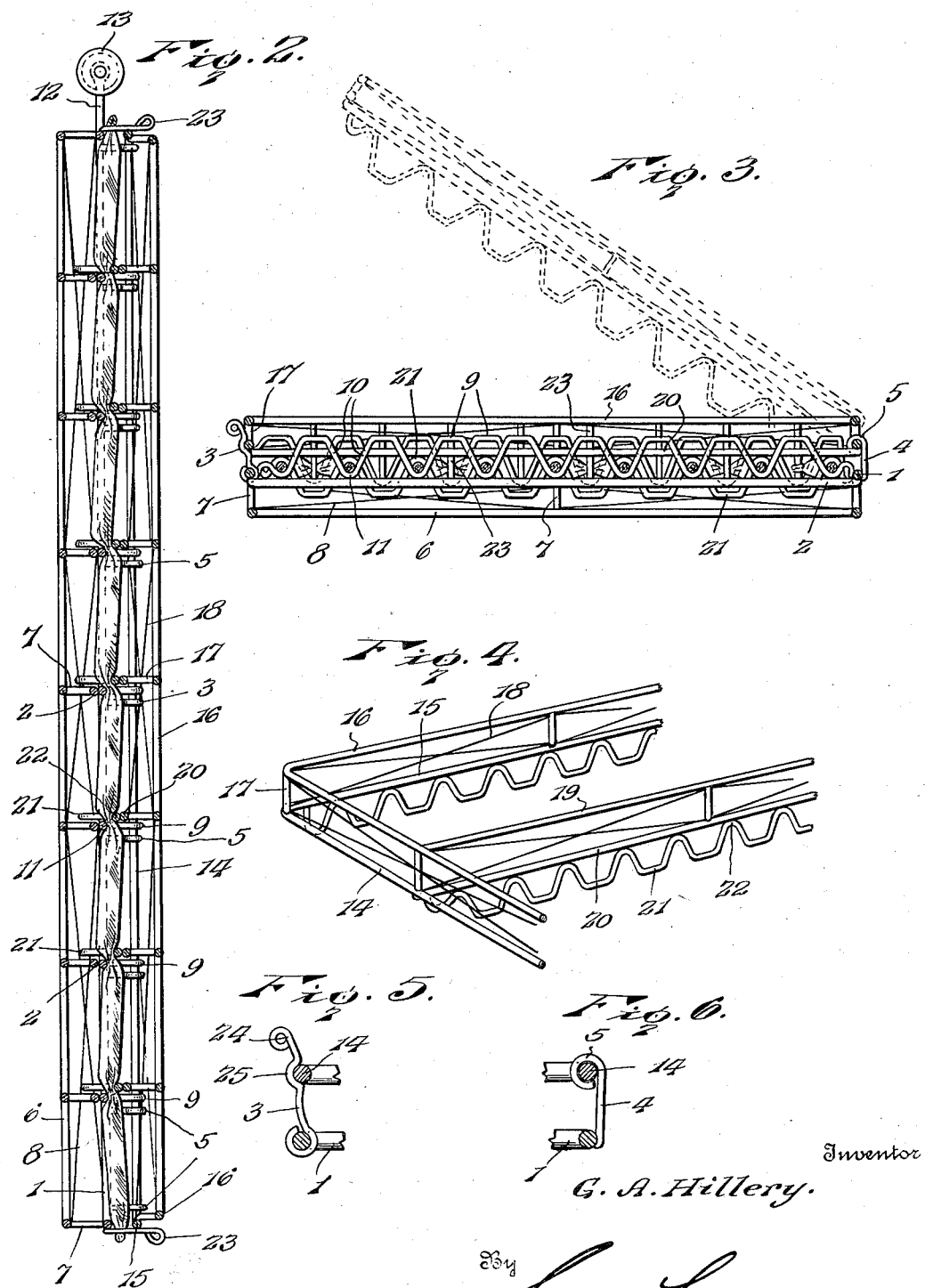

2,052,092

UNITED STATES PATENT OFFICE 2,052,092

APPARATUS FOR LINKING SAUSAGE

George A. Hillery, New Orleans, La.

Application September 11, 1933, Serial No. 689,005

5 Claims. (Cl. 17—34)

This invention relates to sausage formers, and has for its object the provision of means whereby the filled sausage will be formed into links expeditiously and with minimum labor. The invention provides means whereby the sausage to be formed into links may be placed in a holding member and pressure then applied through an upper member to constrict the sausage at stated intervals so that the desired link formation will be attained. The invention seeks to provide an apparatus for the stated purpose which will be efficient in operation and which will be inexpensive and possess sufficient rigidity to withstand the strains put upon it in usage. The invention is illustrated in the accompanying drawings and will be hereinafter first fully described, the novel features being particularly defined in the appended claims.

In the drawings,

Figure 1 is an elevation of an apparatus embodying the present invention,

Figure 2 is a longitudinal section on the line 2—2 of Figure 1,

Figure 3 is a transverse section on the line 3—3 of Figure 1,

Figure 4 is a detail perspective view of one corner of the upper pressure frame, Figure 5 is an enlarged detail section on the line 5—5 of Figure 1, Figure 6 is an enlarged detail section on the line 6—6 of Figure 1.

In carrying out the present invention, there is provided a lower or supporting frame 1 which may be conveniently formed of wire but may, of course, be formed of any suitable material, non-corrodible metal being preferred for obvious sanitary reasons. The frame 1 is substantially rectangular in outline and includes transverse bars 2 which are welded or otherwise permanently united with the sides of the frame, at their ends, and are disposed at regular intervals in the length of the frame. Also, at proper intervals along one side of the frame are secured latches 3 which may be of any detail form but are resilient so as to engage an upper frame and hold the same to the lower frame, as will presently more fully appear. At the opposite side of the frame, there are secured thereto, at regular intervals, hinge members 4 which may be stout wires or light rods permanently secured, as by welding, at their lower ends, to the frame 1 and provided at their upper ends with eyes 5 which encircle the side member of an upper frame so as to connect said frame with the lower or supporting frame and permit relative pivotal movement thereof. A supplemental or bracing frame 6 is secured on the underside of the lower frame and is of a substantially rectangular form, having the same dimensions as the supporting frame. This supplemental bracing frame is connected at the corners and at intervals along its sides and ends with the supporting frame by short posts 7, and diagonally disposed guy wires or braces 8 are secured to the two frames and to the posts connecting the same so that the structure will be thoroughly rigid and able to withstand the pressure and strain exerted thereon in the use of the device. On the upper side of the transverse bars 2 of the supporting frame there are provided transverse series of rests or seats for the sausage which is to be linked, said rests being indicated at 9. Each of these rests comprises a stout wire or light bar or rod bent at intervals so that the portions 10 between the bends will extend in zigzag form from end to end of the rests. The several alternate bends are united with the respective transverse bars 2 while the portions 10 constitute V-shaped guides which will direct the sausage into the seats 11, which are disposed directly upon and secured to the transverse bar of the frame.

An upper frame is provided which is also of rectangular form and of the same dimensions as the first-described frame, and it may be noted that the terms upper and lower are used herein merely as a matter of convenience. The first-described frame is generally placed upon a work bench or table when a length of sausage is to be placed within the device to be linked, but the sausage may be placed in the frame while it is suspended in a vertical position, as indicated in Figures 1 and 2 of the drawings, a suspending device being provided at, what is then, the upper end of the lower frame and this suspending device may be an ordinary hook, but will preferably consist of a short post 12 carrying a grooved roller 13 in order that the apparatus may be placed on a track rail and shifted through the several divisions of a sausage plant so that the sausage may be subjected to the usual processing while still held in the linking frames. The upper frame may be said to be a substantial duplicate of the lower frame consisting of side bars 14 and end bars 15 having a supplemental bracing frame 16 connected thereto by posts 17, and bracing or guy wires 18 being disposed between and connected to the main and supplemental frames, as will be understood upon reference to Figure 4. The bracing frame includes members, shown at 19, which extend transversely of the device and are connected by posts and guy wires to transverse bars 20 which constitute a part of the upper frame. These transverse bars 20 are provided with presser members 21 having the same zigzag form previously mentioned in connection with the sausage rests 9, but are inverted so that the sausage-engaging bends 22 will pass over the sausage which has been seated in the bends 11 on the lower frame. In Fig. 4 the end bar of the frame is shown as carrying a zigzag presser frame, and this is desirable as such presser frame constricts the sausage about the turning pins. At each end of the lower frame, pins 23 are provided thereon and these pins constitute stakes about which the sausage may be folded so that it may be carried back and forth through the entire length of the device, as will be understood upon reference to Figure 1.

When the device is to be used, it is placed upon a table or other fixed support and the upper frame is swung up and over out of the way. One end of the length of sausage is then secured to the turning pin 23, at one corner of the frame, and the sausage is then carried to the opposite end of the frame and caused to rest upon the successive seats 11. At the opposite end of the frame, the sausage is bent around the corner turning pin 23 and then carried back to the starting end of the frame to rest upon the successive seats and be again bent around a turning pin, this operation being repeated until the sausage has been strung over the entire frame. The upper frame is then swung over and down onto the lower frame so that the bends 22 of the sausage-engaging compressing members on the upper frame will engage the sausage immediately at the sides of the several seats 11 so that the sausage at said seats will be pinched or constricted and the desired link formation will be imparted thereto. As the upper frame swings downwardly, the side bars of the same will ride upon the upper inclined ends 24 of the several latches 3 and will seat in the notches or bends 25 of the latches so as to be firmly held thereby, as will be understood upon reference to Figure 5. The sausage is not removed from the linking or compressing apparatus but the apparatus with the sausage therein is suspended on a track by means of a grooved roller 13, or a hook in the same place, and then shipped along the track through the processing divisions of the sausage factory so that it may be prepared for the market. When the sausage, held in the frame, has been cooked and otherwise processed, it will retain the linked shape imparted thereto, after being removed from the frame.

It may be noted, upon reference to Figure 1, that the pins 23 are provided at the ends of the frame in greater numbers than will always be needed for the placing of the sausage in the frame. This provision of surplus or idle pins will permit the sausage to be passed through the apparatus parallel with the sides of the frame, as illustrated, or strung through the several seats, in relatively diagonal lines, to pass between alternately located pins at the opposite ends of the frame. It will be readily seen that I have provided a very simple and inexpensive apparatus which will permit a long length of sausage to be linked at one operation and when the two frames have been brought together, the several latches on the supporting frame will retain the pressure frame in proper relation thereto so that the pressure upon the sausage will not be released, although when the sausage is to be removed the latches may be readily disengaged from the pressure frame to release the same. The portions between the successive bends or sausage-engaging elements converge toward the frame to which they are secured so that they guide the sausage to the several seats and also properly center the upper elements over the sausage when the necessary linking pressure is exerted thereon. The open formation of the frame facilitates the cleaning of the same so that it may be very easily kept in a sanitary condition.

Having thus described the invention, I claim:

1. A sausage linking apparatus comprising like rigid frames hingedly connected at one side and provided with fixed sausage-engaging seats on their opposed faces whereby to engage a sausage at opposite sides thereof to constrict the same, and means for retaining the frames in sausage constricting relation.

2. A sausage linking apparatus comprising like rigid frames, means at the opposite sides of the frames for holding them in closed relation, and rigid mating seats on the opposed faces of the frames adapted to engage opposite sides of a sausage at intervals in the length thereof to constrict the same at the points of engagement.

3. A sausage linking apparatus comprising similar frames hingedly connected at one side, means at the opposite sides of the frames for holding them in closed relation, mating seats on the frames adapted to engage opposite sides of a sausage at intervals in the length thereof to constrict the same at the points of engagement, and bracing frames secured on the outer sides of the hingedly connected frames and co-extensive therewith.

4. A sausage linking apparatus comprising like rigid frames, hinge members fixed on one side of one frame and having one end looped over the corresponding side of the mating frame, latches on the opposite sides of the frame to hold them in closed relation, and rigid mating sausage-engaging elements on the opposed faces of the frames, said elements each consisting of a transverse rod of zig-zag form from end to end and rigidly secured at its ends and at each bend to the correlated frame.

5. A sausage-linking apparatus comprising substantially similar rigid frames hingedly connected at one side and provided with recessed sausage-engaging seats on their opposed faces whereby to engage a sausage at opposite sides thereof to constrict the same, and means for retaining the frames in sausage-constricting relation.

GEORGE A. HILLERY.